United States Patent
Bloks

[11] Patent Number: 5,633,871
[45] Date of Patent: May 27, 1997

[54] SIGNAL PROCESSING SYSTEM

[75] Inventor: Rudolf H. J. Bloks, Eindhoven, Netherlands

[73] Assignee: U.S. Philips Corporation, New York, N.Y.

[21] Appl. No.: 496,352

[22] Filed: Jun. 29, 1995

[30]  Foreign Application Priority Data

Jul. 5, 1994 [EP] European Pat. Off. .............. 94201945
Jul. 7, 1994 [EP] European Pat. Off. .............. 94201967

[51] Int. Cl.$^6$ .............................. H04J 3/16; H04L 12/40
[52] U.S. Cl. .............................................................. 370/471
[58] Field of Search ........................ 370/60, 60.1, 94.1, 370/94.2, 82, 71, 85.1, 85.7, 85.2, 85.3, 95.1, 95.2, 67, 68; 348/423, 461, 500, 510, 518, 526, 426, 466, 467

[56]  References Cited

U.S. PATENT DOCUMENTS

| | | | |
|---|---|---|---|
| 5,287,182 | 2/1994 | Haskell et al. | 348/500 |
| 5,365,272 | 11/1994 | Siracusa | 348/426 |
| 5,376,969 | 12/1994 | Zdepski | 348/466 |
| 5,448,568 | 9/1995 | Delpuch et al. | 370/94.2 |

OTHER PUBLICATIONS

"Information Technology —Coding of Moving Pictures and Associated Audio for Digital Media at up to About 1.5Mbit/s, Part 1: Systems", first edition 1993–08–01.

"High Performance Serial Bus P1394", draft 6.7 version 1 issued Feb. 18, 1994 by IEEE Standards.

"Information Technology —Generic Coding of Moving Pictures and Associated Audio Information —Part 1: Systems", ISO/IEC JTC 1/SC 29/WG 11 Editorial Group, N658, Jan. 12, 1993.

*Primary Examiner*—Wellington Chin
*Assistant Examiner*—Soon-Dong Hyun
*Attorney, Agent, or Firm*—Edward W. Goodman

[57]  ABSTRACT

A signal processing system contains a source apparatus coupled to a destination apparatus via a bus operable according to a time-slot allocation protocol. The source apparatus is arranged for supplying a sequence of packets, each having a time-stamp via the bus to the destination apparatus. The destination apparatus includes a clock and is arranged for receiving the packets, for detecting when the time-value of the clock corresponds to the time-stamp in a particular packet, and for thereupon presenting data from that particular packet at an output, operable according to a time-slot allocation protocol. The source apparatus is arranged for supplying a first and a second part of at least one of the packets in different time-slots, the destination apparatus being arranged for presenting data from the first and second part together upon detecting when the time-value of the clock corresponds to the time-stamp in the at least one of the packets.

7 Claims, 8 Drawing Sheets

SIGNAL PROCESSING SYSTEM

BACKGROUND OF THE INVENTION

1. Field of the Invention

The invention relates to a signal processing system comprising a source apparatus coupled to a destination apparatus, the source apparatus being arranged for supplying the destination apparatus with a sequence of packets, each comprising a time-stamp, the destination apparatus comprising a clock and being arranged for receiving the packets, for detecting when the time-value of the clock corresponds to the time-stamp in a particular packet, and for thereupon presenting data from that particular packet at an output. The invention also relates to a source and destination apparatus for such a system.

2. Description of the Related Art

Such a system is known for example from the ISO/IEC 11172-1 standard, "Information technology-coding of moving pictures and associated audio for digital storage media at up to about 1.5 Mbit/s, Part 1: Systems", first edition 1993-08-01, which will be referred to as the MPEG standard. The systems described by it will be referred to as MPEG systems; these contain for example, an MPEG encoder as source apparatus and an MPEG decoder as destination apparatus.

To supply MPEG encoded signals in a system with more than two apparatuses, it is desirable to supply the MPEG encoded signals over a bus to which a plurality of apparatuses can have access. Such a bus requires an access protocol, which allows different apparatuses to have access in different time-slots allocated to the respective apparatuses. One or more packets can be supplied during a time-slot, and in principle, the duration of the time-slot can be selected to fit the number of packets that have to be transmitted in it.

To minimize the overhead required for time-slot allocation, it is desirable that the time-slot are periodically repeated, each time with the same duration. In this case, the time slot should have a duration long enough to accommodate all the packets that may arrive in a repetition period of time-slot allocation. However, this may lead to overhead when each period of time-slot allocation does not contain the same, integer number of periods of packet arrival, or when the packets arrive irregularly.

It is an object of the invention to reduce the overhead occurring in supplying signal packets over a bus in fixed length time-slots.

SUMMARY OF THE INVENTION

The signal processing system according to the invention is characterized, in that it comprises a bus operable according to a time-slot allocation protocol, the source apparatus being arranged for supplying the packets to the destination apparatus via the bus, and for supplying a first and a second part of at least one of the packets in different time-slots, the destination apparatus being arranged for presenting data from the first and second part together upon detecting when the time-value of the clock corresponds to the time-stamp in the at least one of the packets. Thus fractions of packets can be transmitted in the time-slots. This allows the duration of the time-slot to be matched to the average number of packets arriving in a period of the time-slot allocation pattern, whereas the packet can be output as a whole, with its original timing using the time-stamp.

In principle, the second part of the packet can be followed, in its time-slot by data from a further packet. However, this can cause problems if a error occurs during reception of the data from the time-slot which contains the first part of the packet, because if the first part of the packet is not received, it is impossible to determine how much of the data in the next time slot belongs the second part and how much belongs to the further packet. Hence, the reception of the further packet is disturbed, even though it is (at least in part) contained in a time-slot that is received without errors.

In an embodiment of the signal processing system according to the invention, the destination apparatus is arranged for supplying at least part of at least a further one of the packets after supplying the second part, the further one of the packets being supplied in the particular time-slot in which the destination apparatus supplies the second part, and for supplying an identification, for identifying a location in the particular time-slot of the further one of the packets, the identification being supplied at a predetermined location in the particular time-slot. This makes it possible to recover the further packet even if it is not known how much of the packet was transmitted in an earlier time-slot.

In another embodiment of the signal processing system according to the invention, the source apparatus is arranged for obtaining respective time-samples of a clock at the start of arrival of the packet and at the end of arrival of the packet at its input, and for transmitting information about said time-samples to the destination apparatus, the destination apparatus being arranged for regulating a speed of presenting said packet in accordance with a difference between said time-samples. In this way, the duration of the packet can be faithfully reproduced in the destination apparatus independent of other packets, even if the start and the end are in different time-slots with a pause between the start and the end. The time stamps are preferably added to the packets irrespective of their content, i.e., in addition to the PTS time stamp of MPEG packets.

In an embodiment of the signal processing system according to the invention, the destination apparatus comprising a first in first out buffer, means for storing time-stamps received via the bus in the first in first out buffer, and means to start comparing each time stamp with a count value of the clock, as soon as the time-stamp preceding it in the first in first out buffer matches the count value of the clock. This allows the reconstruction of packets irrespective of whether they are supplied in a single time slot or split over different time-slots.

BRIEF DESCRIPTION OF THE DRAWINGS

Further advantageous aspects of the system according to the invention will be discussed using figures, in which:

FIG. 4 shows a further improved signal processing system according to the invention, while

DESCRIPTION OF THE PREFERRED EMBODIMENT

Figure 1:
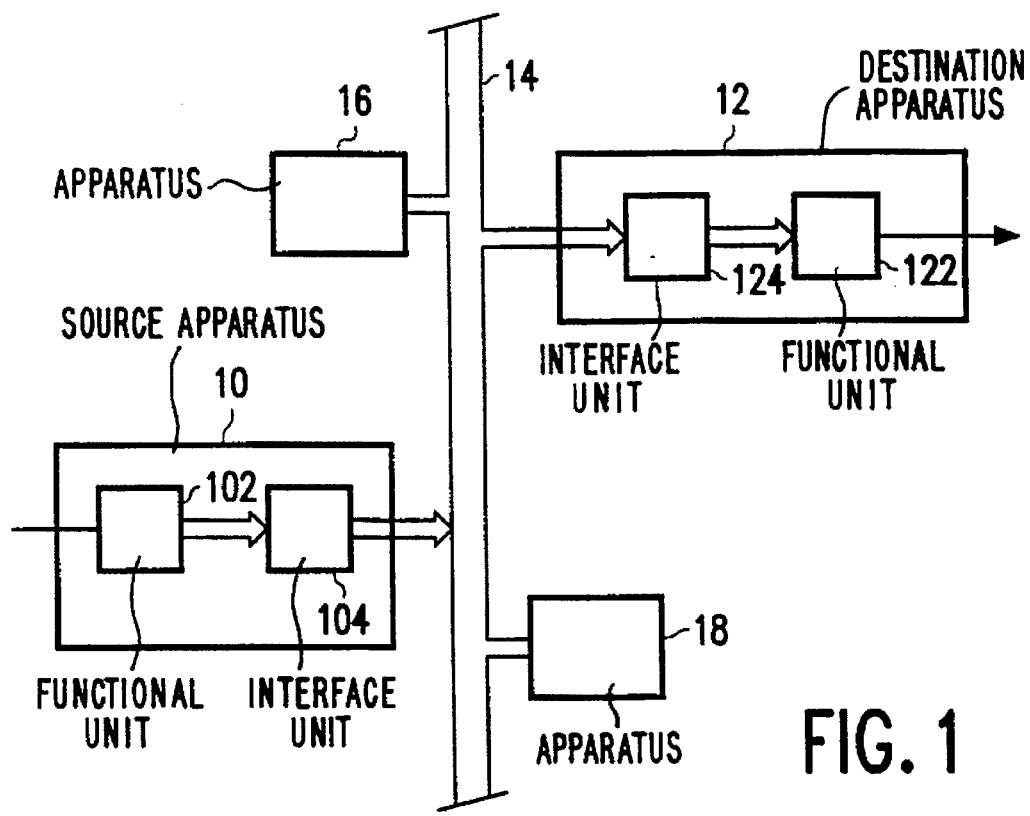
FIG. 1 shows part of a signal processing system containing a number of apparatuses.

FIG. 1 shows part of a signal processing system containing a number of apparatuses 10, 12, 16, 18, connected via a bus 14. The bus 14 is shown sliced off to indicate that it may extend to further apparatuses (not shown) in the system. A first one of the apparatuses 10 is shown as a source apparatus, a second one of the apparatuses 12 is shown as a destination apparatus. The source apparatus 10 contains a functional unit 102, and an interface unit 104. The destination apparatus 12 contains an interface unit 124 and a functional unit 122. The system is suitable for passing video signal information, among others, via the bus 14, examples of the apparatuses being a broadcast receiver, a video recorder, a display system, etc. In case of the video recorder, which may serve both as source apparatus and as destination apparatus, the readout mechanism, the channel encoding/decoding mechanism etc. are located in the functional unit 102, 122.

In operation, the bus 14 is operated with a protocol that allows communication between pairs of apparatuses (e.g. 10, 12) that are selected from the more than two apparatuses 10, 12, 16, 18 that are connected to the bus 14, or between one source (e.g. 10) and multiple receivers (e.g. 12, 16, 18). An example of a bus 14 with such a protocol is the P1394 bus defined by Apple ("High Performance Serial Bus P1394", draft 6.7 version 1 issued Feb. 18, 1994 by the IEEE standards department). According to this protocol, when a source apparatus 10 has to transmit video information, it requests a time-slot on the bus 14. According to the bus protocol, a particular time-slot, from a periodically repeating set of time-slots is then allocated to the source apparatus 10.

Figure 2:
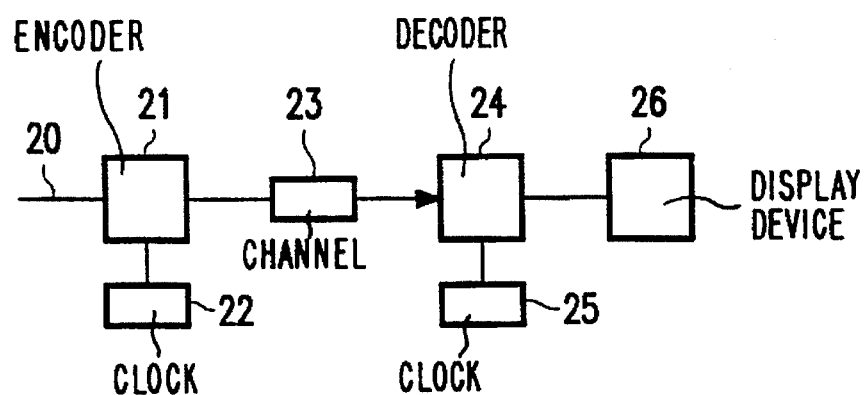
FIG. 2 shows the connection configuration between apparatuses used to define the MPEG standard.

Video information can be encoded and decoded according to the MPEG standard. FIG. 2 shows the connection configuration between apparatuses used to define the MPEG standard. The connection configuration has an input 20, for supplying unencoded video information to an encoder 21. The encoder 21 is coupled to a decoder 24 via a channel 23. The decoder 24 is coupled to a display device 26. The encoder 21 and decoder 24 are coupled to respective clocks 22, 25. The encoder 21 and decoder 24 can be used as source apparatus 10 and destination apparatus 12 in a system as shown in FIG. 1, the bus 14 of FIG. 1 serving as channel 23 of FIG. 2.

In the MPEG encoding process, the presentation units of the signal arriving at the input 20 are associated with time-stamps. Each time-stamp is a sample of the time value of the clock 22 coupled to the encoder 21. This clock runs at a frequency of 90 kHz. The sampling instant is determined by the time of arrival at the encoder 21 of the presentation unit with which the time-stamp is associated.

In the MPEG decoding process, the time-stamps are used to ensure the proper relative timing of the instants at which the presentation units are presented at the output of the decoder 24 for display on the video display device 26. This is to ensure that the video signal is presented at the proper speed, that video and audio remain synchronized, and that the decoder 24 can properly manage its buffers. In order to do this properly, the clock 25 coupled to the decoder 24 needs to be synchronized to the clock 22 of the encoder 21. To achieve synchronization, the encoder 21 sends system clock references (SCRs) to the decoder 24. These references contain the time value of the clock 22 of the encoder 21 at the time of sending, for example, when the SCR value is put on the bus 14 in the time-slot that is allocated to the encoder 21 as source apparatus 10. This allows the decoder 24 to set the time value of its clock 25 to the time value contained in the SCR at the time of arrival of the SCR, thus synchronizing its clock to the clock of the encoder 21.

The situation becomes more complicated when a video recorder is used as a source apparatus 10, or if any other apparatus that merely passes the MPEG signal, but does not create it, is used as source apparatus 10. Such an apparatus will need to buffer an incoming MPEG signal until the beginning of the time-slot in which it can be transmitted to the destination apparatus. This means that the time value of the SCR signal will in general, no longer correspond to the time of transmitting the SCR signal. If the destination apparatus 12 of FIG. 1 is a decoder 24 as described in FIG. 2, this would mean that the SCR signal can no longer be used to synchronize the clock 25.

Figure 3:
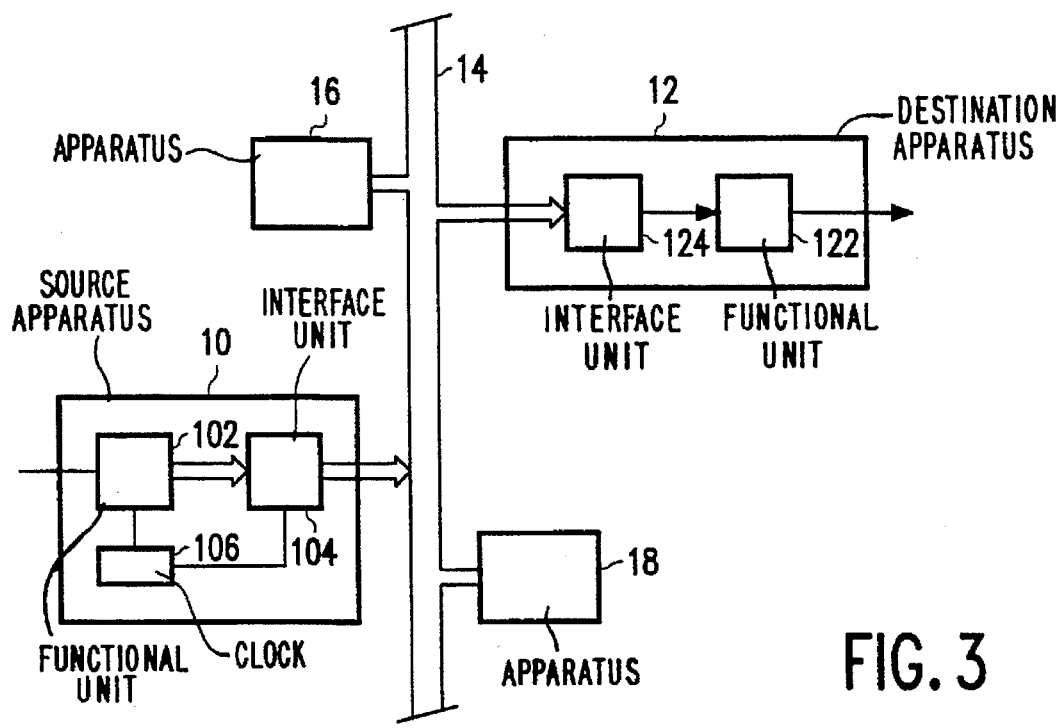
FIG. 3 shows a signal processing system according to the invention.

FIG. 3 shows a system for correcting this. The Figure is similar to FIG. 1 and uses identical reference numerals. In addition to the features of FIG. 1, a clock 106 has been included in the source apparatus 10, which is an apparatus for passing a received MPEG signal. In the system according to FIG. 3, the timing error is corrected by replacing the SCR time values by time values that correspond to the time of the transmission of the SCR signal. To achieve this, an additional clock 106 is included in the source apparatus 10. The additional clock 106 is synchronized to the MPEG signal, as described hereinabove for the clock 25 of the decoder. The additional clock 106 is sampled at an instant corresponding to the instant at which the SCR signal is transmitted in the time-slot which is allocated for transmission according to the bus 14 protocol. The sampled value is used to replace the SCR value in the MPEG signal that is passed by the source apparatus 10.

A video recorder/reproduction apparatus, which retrieves the MPEG signal from a record carrier, may be used as source apparatus 10. In principle, the MPEG signal might be recorded on the record carrier after some elementary channel encoding particular to the recording medium. If the speed of the record carrier is the same on recording and reproduction this would result in a properly timed MPEG signal. However, it has been found that if reproduction were done this way, the SCR timing of the SCR signal as it is recovered from the record carrier is no longer correct, for example due to effects such as tape stretching.

From a co-pending patent application Ser. No. 08/225, 193, filed Apr. 8, 1994, to the same assignee (inventor van Gestel, assignees' reference PHN14818, in particular page 22 line 23 and following), which is incorporated herein by reference, a mechanism is known to correct for this. For this mechanism, the video recorder comprises a further clock. In the recording mode, the further clock is used to associate further time-stamps with the MPEG signal received in the video recorder, for example, from an encoder 21. These further time-stamps are recorded on the record carder together with the MPEG signal, such that it is possible to identify the points in the MPEG signal that correspond to the further time-stamps.

When the video recorder is used to reproduce the MPEG signal, the further clock is also used. The time value of the further clock is compared to the further time-stamps that have been recorded on the record carrier and the result of the comparison controls the reproduction speed of the MPEG signal, such that the relative timing of the originally recorded MPEG signal is reproduced with reference to the additional clock.

The reproduced signal can subsequently be transmitted over the bus 14, as described hereinabove with reference to FIG. 3, correcting the SCR time values according to the time-slots in which the source apparatus 10 is given access to the bus 14.

However, when the source apparatus 10 merely passes the MPEG signal, as is the case for a video recorder, it is disadvantageous that for this correction, the source apparatus has to interpret the MPEG signal in order to locate the SCR signals.

Figure 4:
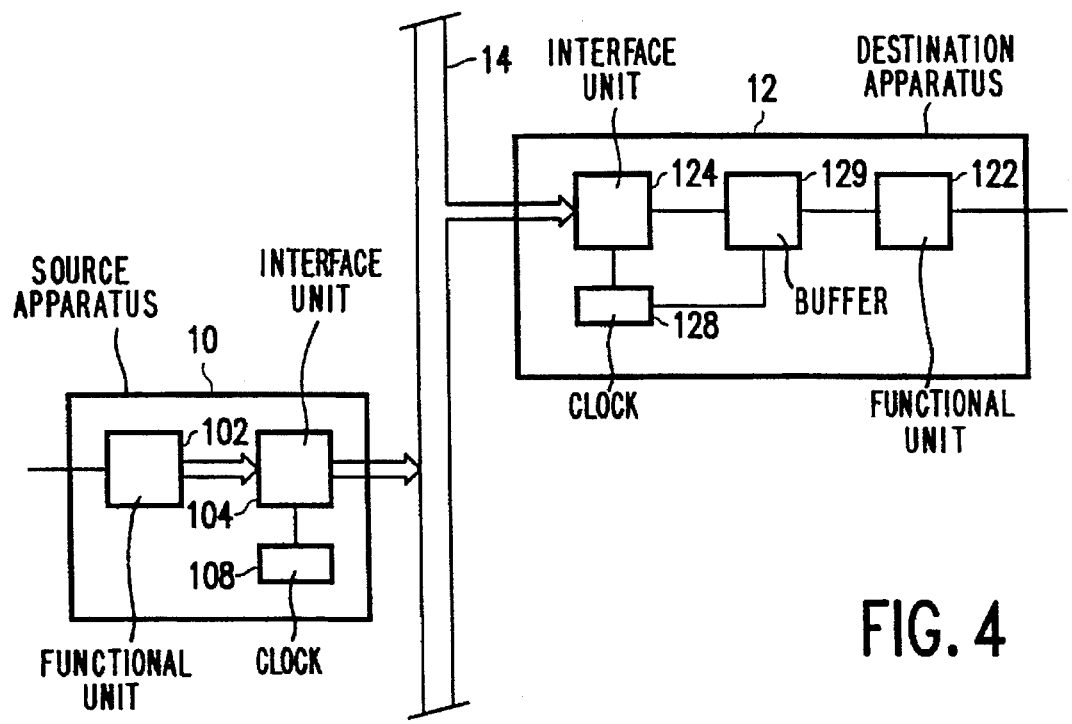

FIG. 4 shows an improved system for correcting this. The Figure is similar to FIG. 1 and uses identical reference numerals. In addition to the features of FIG. 1, the system contains a clock 108 coupled to the interface units 104 of the source apparatus 10. The system furthermore contains a buffer 129 coupled between the interface unit 124 and the functional unit 122 of the destination apparatus 12, and a clock 128 coupled to the interface unit 124 and the buffer 129 in the destination apparatus.

In operation, the clocks 108, 128 in the source apparatus 10 and destination apparatus 12 are synchronized to each other, for example, in response to signals which are periodically created on the bus 14 by a time-master apparatus, which may be any of the apparatuses 10, 12, 16, 18 connected to the bus 14. These clocks run for example, at a frequency of about 25 Mhz, that is, much faster than the clock in the MPEG decoder, thus minimizing inaccuracies due to jitter.

Figure 4A:
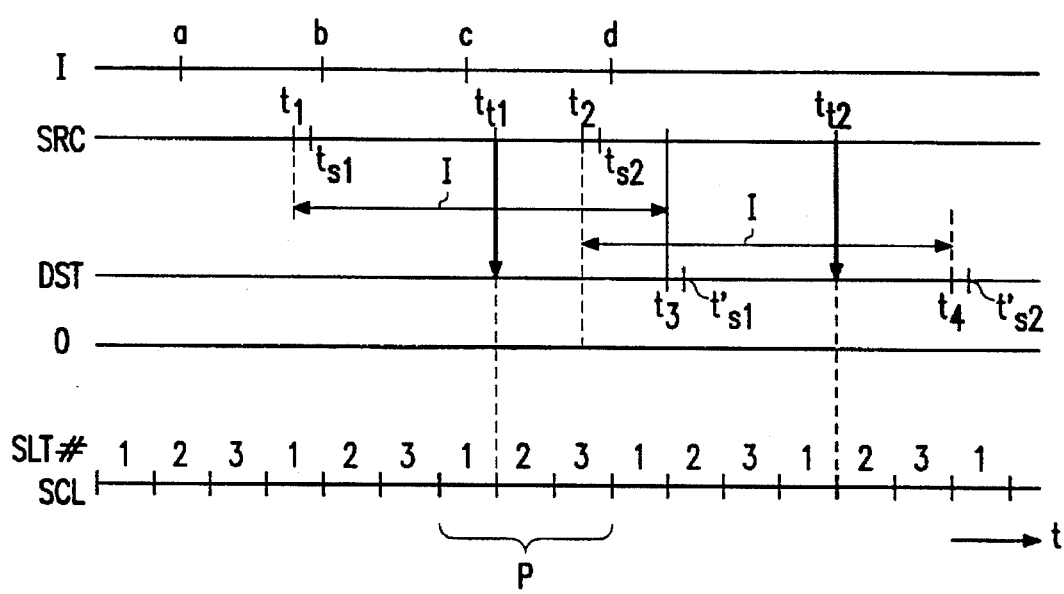
FIG. 4a shows the timing of various signals in the system of FIG. 4.

The timing of the various signals is shown in FIG. 4a, which contains a time scale SCL on which successive slots have been indicated, each with a slot number SLT#. The slot numbers repeat periodically. Above this time scale, four lines I, SRC, DST, O are used to indicate the instants of events in the signal encoded by the MPEG signal 10 (I), in the interface unit 104 (SRC), in the interface unit 124 (DST), and at the output of the destination apparatus 12 (O), respectively.

The signal which is encoded by the MPEG signal contains events at instants a,b,c,d which have to be recreated with their original relative timing at the output of the destination apparatus 12.

The functional unit 102 in the source apparatus is arranged to supply an MPEG signal to the interface unit, such that the SCR signals appear at their correct instants (e.g. $t_s$ on the line marked SRC). Upon reception of the MPEG signal, at an instant $t_1$, the first interface unit 104 samples its clock 108. Subsequently, in the time-slot allocated to it according to the bus protocol, the interface unit 104 transmits the MPEG signal in combination with the sampled value of the clock 108. The MPEG signal is received by the second interface unit 124. This interface unit 124 places the signal in the buffer 129 until the clock 128 of the destination apparatus 12 exceeds the sampled value of the clock 108 transmitted with the MPEG signal by a predetermined delay value, upon which the MPEG signal is passed from the buffer 129 to the destination apparatus 12. In this way, the timing of the signal produced by the functional unit 102 of the source apparatus 10 is reproduced with the delay value, which is chosen at least as large as the maximum delay that can be caused by waiting for the time-slot allocated to the source apparatus 10 according to the protocol used for the bus 14.

The best way to ensure correct timing of the instant at which the SCR signal is delivered to the functional unit 122 in the destination apparatus 12, is to sample the time value of the clock 108 at the instant that the SCR signal is presented to the interface unit 104 of the source apparatus 10, and to supply this signal to the functional unit 122 according to the obtained sample. However, this requires interpretation of the signal, in order to locate the SCR signal.

A preferred alternative is to sample the clock 108 in the source apparatus 10 both at the instant at which the interface unit begins receiving an MPEG signal packet, and at the instant that reception ends. Thus, the duration of the packet is measured in terms of periods of the clock 108 in the source apparatus 10. Information describing the start of the packet and its duration is transmitted via the bus 14 to the destination apparatus 12.

In the destination apparatus 12, the speed with which the packet is supplied to the functional unit is adapted, in order to make its duration, in terms of the time values of the clock 128 in the destination apparatus 12, equal to that transmitted with the packet from the source apparatus 10. This can be realized for example, by supplying each byte of information from the packet only if the time value of the clock 128 exceeds the time value at the start of transmission by a fraction of the received duration value, the fraction corresponding to the relative position of the byte in the packet. In this way, even though no interpretation of the packet occurs, all signals inside the packet, such as the SCR signal will remain properly timed.

The transmission of the information describing the samples of the clock 108 at the start and the end of the packet preferably does not contain the full sample of clock 108; a number of most significant bits of these samples may be omitted. Because it is known that the interval between the arrival of the packet at the interface unit 104 of the source apparatus 10 cannot exceed a predetermined maximum, the most significant bits can be reconstructed in the destination apparatus 12. By omitting the most significant part, the transmission capacity required to transmit the samples is reduced.

Furthermore, the information describing the start of the packet is preferably given at least in part as a difference relative to the sample value describing the end of the packet. In this way, the capacity required to transmit the samples is reduced. However, a least significant part of the information describing the start of the packet is preferably transmitted as a clock sample, i.e., not differentially relative to the end of the packet. In this way, only the most significant parts of the information describing the start of the packet and the information describing the end of the packet need to be summed in order to compute the instant at which outputting of the data from the packet from the interface unit 124 in the destination apparatus 12 begins; the least significant part need not be summed. This economizes on both computation effort and transmission capacity.

Preferably, the least significant part which is not differentially coded relative to the end of the packet indicates the phase in the periodically repeating pattern of time-slots at which the start of the packet is received. The instant at which outputting of the data from the packet the interface unit 124 in the receiving apparatus 12 is initiated is then preferably an integer number of periods of the periodically repeating pattern of time-slots after the arrival of the start of the packet at the interface unit 104 in the source apparatus. This instant is detected by comparing the least significant parts of the clock 128 value in the destination apparatus 12 and that of the information describing the start of the packet, and initiating outputting at the instant when the two match in the period which is a predetermined number of periods after reception of the start of the packet at the interface unit 104 of the source apparatus 10.

A preferred example of a format for transmitting information about the sampled clock 108 in the source apparatus 10 to the destination apparatus 12 is the following (12 bits SPHASE, 5 bits CCI, 12 bits EPHASE, 3 bits ECN)

Wherein

SPHASE is the phase of the clock 108 in the source apparatus at the start of arrival of the packet at the interface unit 104 of the source apparatus 10.

EPHASE is the phase of the clock 108 in the source apparatus at the end of arrival of the packet at the interface unit 104 of the source apparatus 10.

CCI is the difference between the period number of arrival of the start and the end of the packet at the interface unit 104 in the source apparatus 10.

ECN is the period number of arrival of the end of the packet at the interface unit 104 in the source apparatus 10.

The source apparatus 10 may be a video recorder, with a record carrier on which time stamps are recorded that reflect the timing of the MPEG signal as it was received when it was recorded. In that case, the source apparatus will contain two clocks: the clock 104 connected to the interface unit 104, and a further clock (not shown) used in connection with the further time-stamps recorded on the record carrier to reproduce the original MPEG signal before it is supplied to the interface unit 104.

In this case, in principle, it is also possible to omit the use of the clock 108 connected to the interface unit 104 in the source apparatus, and to send the further time-stamps via the bus 14 to the destination apparatus 12, where the proper timing of the MPEG signal is recovered, as described for the video recorder in reproduction mode reproduced. In case the destination apparatus is a recorder in recording mode, it would then not even be necessary to reconstruct the MPEG signal. Instead, the MPEG signal and the time-stamps obtained from the source apparatus 10 (which is a video recorder in this case) could be recorded directly on the record carrier in the video recorder in recording mode, without further time-stamping. In this way the sampling to obtain extra time-stamps is avoided, and with that, additional time jitter is avoided.

However, this would mean that the destination apparatus 12 would have to handle the received signal differently, depending on whether it originated from a video recorder or from another apparatus. To avoid the overhead required for this, it is preferred to use the system of FIG. 4.

Figure 5:
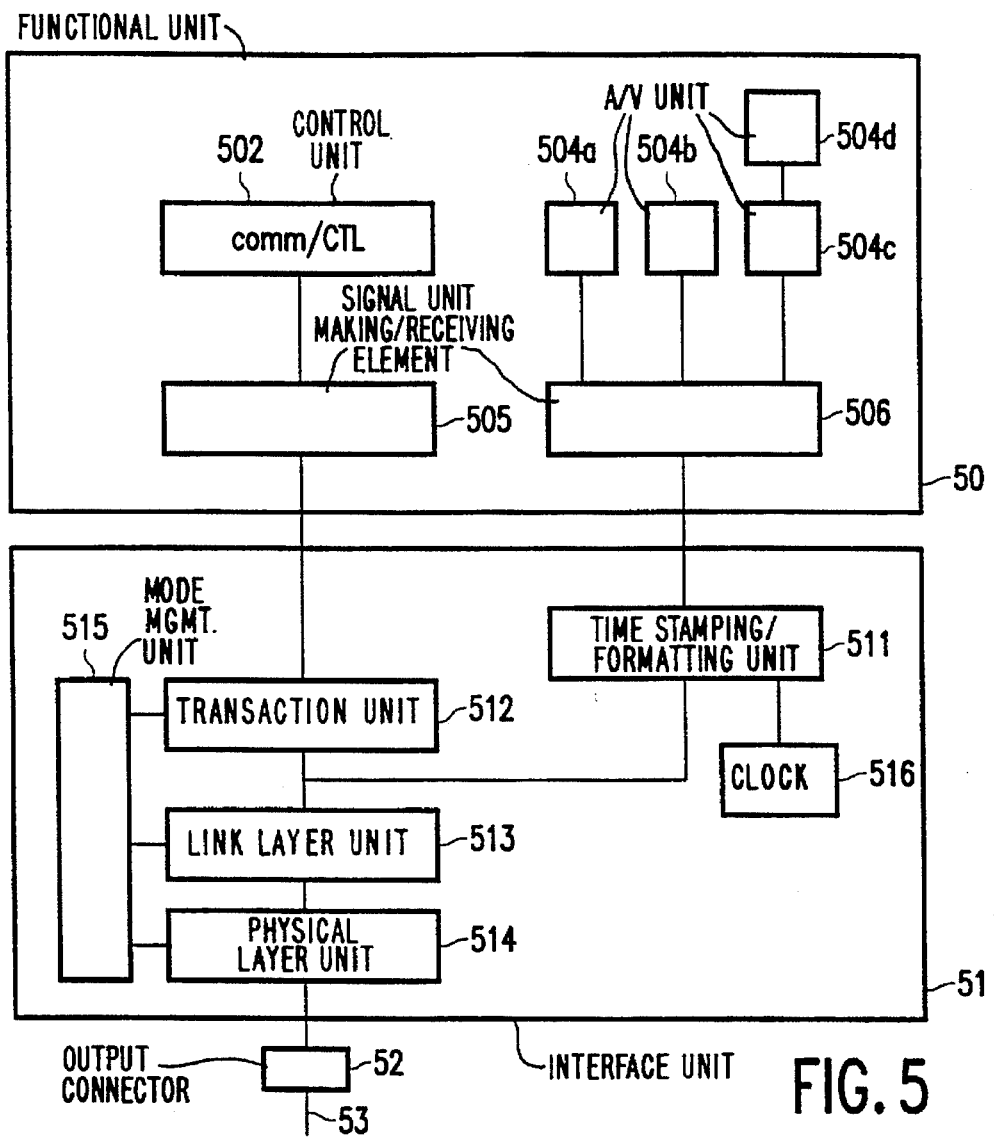
FIG. 5 shows an architecture for a source apparatus for use in the system of FIG. 4.

FIG. 5 shows an architecture for a source apparatus for use in the system of FIG. 4. The Figure shows the functional unit 50 and the interface unit 51, which has an output connector 52 connected to the bus 53.

The functional unit 50 contains a command and control unit 502, and an audio/video unit 504a–504d, which are coupled to respective signal unit making/receiving elements 505, 506 (also in the functional unit 50). The signal making/receiving element 506 for the audio video unit 504a–504d is coupled a time stamping/formatting unit 511 in the interface unit 51. The signal making/receiving element 506 for the command and control unit 502 is coupled to a transaction unit 512 in the interface unit 51. The time stamping/formatting unit 511 is connected to a clock 516. The time stamping/formatting unit 511 and the transaction unit 512 are coupled to a link layer unit 513. The link layer unit 513 is coupled to a physical layer unit, which is coupled to the connector 52. A mode management unit 515 is coupled to the transaction unit 512, the link layer unit 513 and the physical layer unit 514.

The bus allows two types of message packets to be transmitted: so-called asynchronous packets and isochronous packets. According to the bus protocol, the apparatus can request that periodically recurring time-slots are allocated to it. The interface unit 52 then transmits the isochronous packets over the bus in the allocated time-slots. The isochronous packets typically contain audio/video information. The asynchronous packets are also transmitted in time-slots, however these time-slots are not periodically recurrent, but have to be acquired one at a time using a bus arbitration protocol. The asynchronous packets typically contain command and control information.

In operation, the audio/video unit 504a–504d creates for example, an MPEG signal, in combination with header and subcode information signals. In the signal unit making/receiving element 506, these signals are converted into signal units acceptable for the interface unit 51. The signal units are passed to the time stamping/formatting unit 511, which samples the clock 516 upon their arrival, and forms signal packets, containing the signal units received from the functional unit 50 and the sample of the clock 516. These packets are passed to the link layer unit 513, which takes care of addressing the packets, data checking and framing. The packets are passed to the physical layer unit 514, which provides for the electrical interface: detection and transmission of bits, and bus arbitration.

The command and control unit 502, generates signals for commanding and controlling the functioning of one or more other apparatuses that are connected to the bus 53. This information is converted into signal units, and passed to the transaction unit 512 as asynchronous packets. The transaction unit feeds them to the link layer unit 513, for sending in a time-slot which is not occupied by isochronous packets. The packets with command and control information do not receive time-stamps; only the isochronous packets receive time-stamps.

The operation of the transaction unit 512, the link layer unit 513 and the physical layer unit 515 is controlled and coordinated by the node management unit 515.

Figure 6:
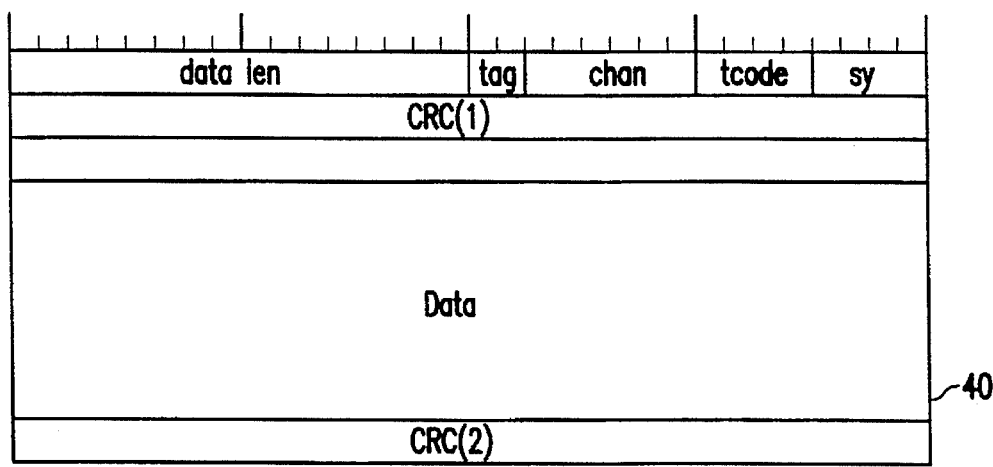
FIG. 6 shows the format of a data packet for transmission by an interface unit.

FIG. 6 shows the format of a data packet for transmission by the interface unit 51. It contains a "data len" field, specifying the length of the data in the packet, a tag field (tag), a channel field (than), a tcode field (tcode), a sync field (sy), fields (CRC(1), CRC(2)) for CRC codes for error correction, the time stamp, and data.

Figure 7:
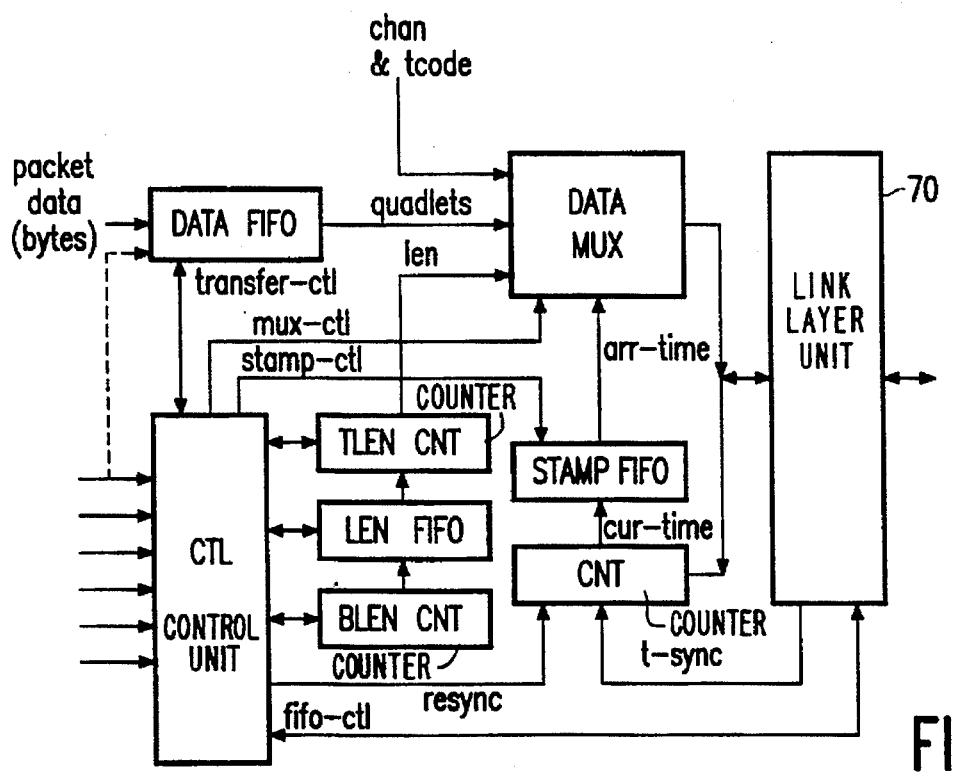
FIG. 7 shows an embodiment of the time stamping/formatting unit in more detail.

FIG. 7 shows an embodiment of the time stamping/formatting unit in more detail. It contains a buffer (data fifo=First In First Out storage), coupled via a data multiplexer (data mux) to the link layer unit 70. The time stamping/formatting unit furthermore contains a control unit (CTL), a counter (CNT) which is coupled to a stamp fifo (STAMP FIFO) and a blength counter (BLEN CNT) which feeds a length fifo (LEN FIFO) which in turn feeds a tlength counter (TLEN CNT). The tlength counter (TLEN CNT) and the stamp fifo have respective outputs coupled to the data multiplexer (data mux). The link layer unit 70 is coupled to the counter (CNT). The control unit (CTL) is coupled to each of the various parts.

In operation, the control unit (CTL) in the interface unit receives from the functional unit several signals, such as a data clock signal, a data valid signal, a start of packet signal, an end of packet signal and a stamp control signal. In response to these signals, the control unit (CTL) controls reading of data (byte by byte) in the data fifo. In response to the stamp control signal, the control unit (CNT) makes the stamp fifo retain a sample of the time value of the counter (CNT). Furthermore the control unit (CTL) controls counting the number of bytes received in the packet, to establish the length of the packet.

When the link layer unit 70 requests that a packet be transmitted to the link layer unit 70, the control unit (CTL) first switches the data multiplexer to pass channel and tcode information and the counted length, subsequently to pass the time-stamp sampled in the stamp fifo and then to pass the data from the data fifo (in so-called quadlets of, each time, four consecutively read bytes).

The counter (CNT) is periodically synchronized to the time of a time master (not shown) by the link layer unit 70, upon a signal from the time master connected to the bus.

Figure 8:
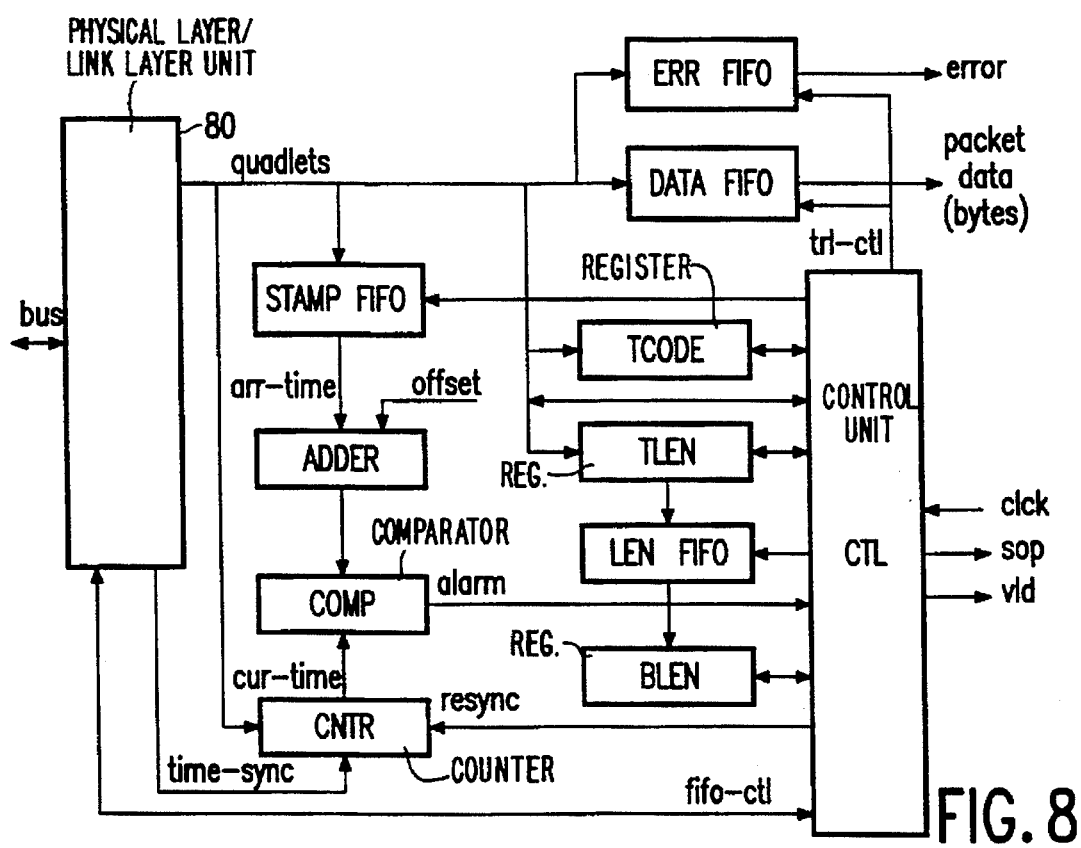
FIG. 8 shows a detailed embodiment of the interface unit in the destination apparatus.

FIG. 8 shows a detailed embodiment of the interface unit in the destination apparatus. It comprises a physical layer/link layer unit 80, coupled to a data fifo, an error fifo, a stamp fifo, a tcode register and a tlen register. The data fifo and the error fifo are coupled to the functional unit in the destination apparatus. The interface unit comprises a counter (CNT) coupled to a comparator, the stamp fifo is coupled to the comparator via an adder. The comparator has an alarm output coupled to a control unit (CTL). The Tlen register is coupled to a len fifo which is coupled to a blen register. All components are coupled to the control unit (CTL).

In operation, the link layer unit 80 passes the data received from the transmitting interface unit via the bus. Under control of the control unit, this information is dispersed over the various registers and FIFOs. The time-stamp is entered into the stamp fifo. From there it is output to the adder in which a predetermined offset is added to the time-stamp. The offset represents the maximum delay that a signal can incur between arriving at the interface unit of the source apparatus and arriving at the interface unit in the destination apparatus. The sum of the time-stamp and the offset is fed to the comparator (COMP), which supplies an alarm signal to the control unit CTL when the counter (CNT) reaches the said sum. In response thereto, the control unit makes the data FIFO supply data received from the link layer unit 80 to the functional unit, and issues a start of packet signal and identifies the data as valid. The data is clocked out of the data FIFO under control of a data-clock supplied by the functional unit.

Figure 9:
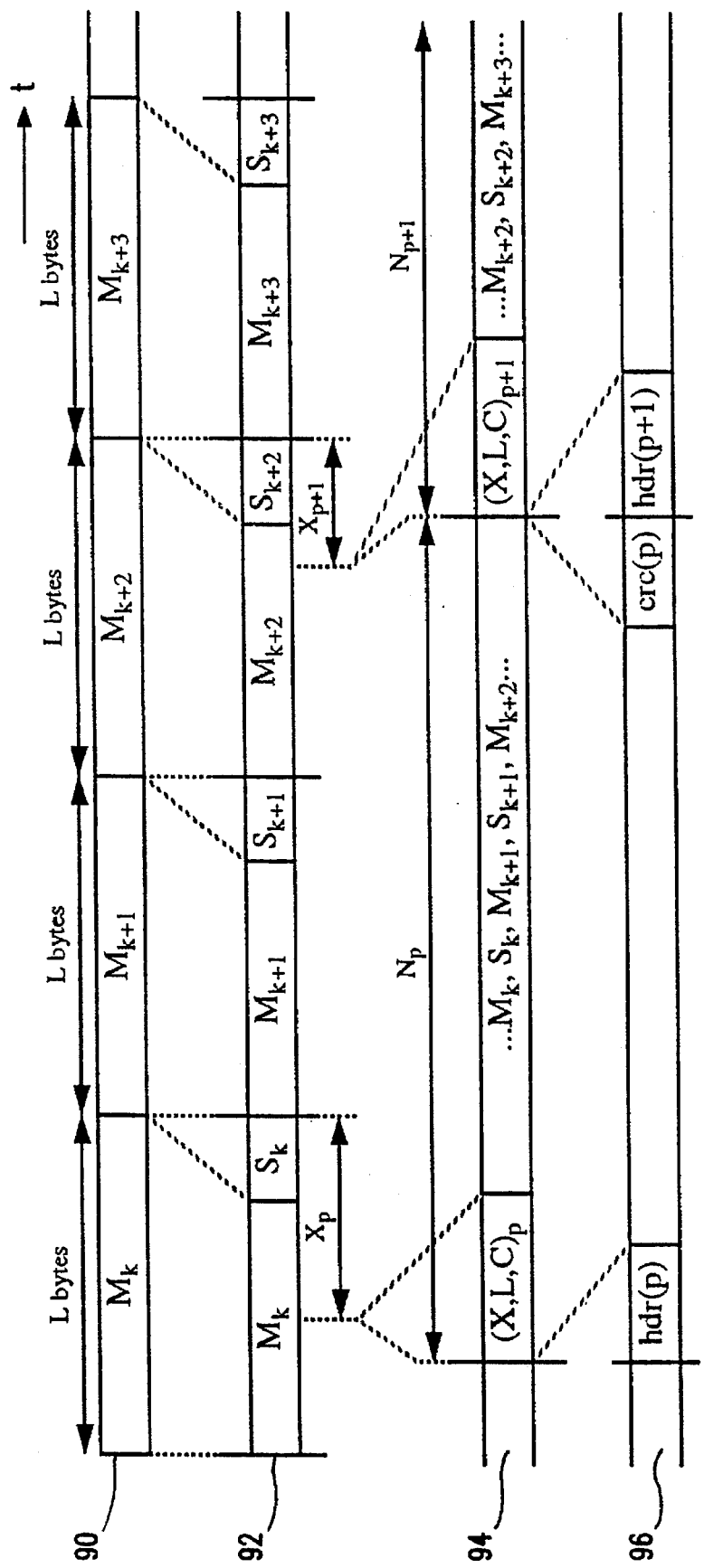
FIG. 9 shows the steps in constructing data frame for transmission via the bus.

FIG. 9 shows the steps in constructing data frame for transmission via the bus. The Figure shows four traces 90, 92, 94, 96 as a function of time.

The first trace 90 shows the data as it arrives at the interface unit 104 in the source apparatus 10. The data consists of packets $M_k$, $M_{k+1}$, $M_{k+2}$, $M_{k+3}$ each of L bytes. The second and third trace 92, 94 show intermediate phases in the construction of data frames for transmission in the time-slot. In the second trace, time-stamp information $S_k$, $S_{k+1}$, $S_{k+2}$, $S_{k+3}$ has been inserted between the packets $M_k$, $M_{k+1}$, $M_{k+2}$, $M_{k+3}$. Each item of time-stamp information $S_k$ may contain for example the time-value of the clock 108 at the arrival of some reference point in the packet $M_k$ (such as its start), or also information about the time value a further reference point (such as its end). In the third trace 94, introductory parts $(X,L,C)_p$ have been inserted at certain points in the signal shown in the second trace 92. The introductory part contains the length L of the packets and the sequence number C of each frame. Furthermore, in the third trace 94, respective frames $N_p$, $N_{p+1}$, each starting with an introductory part, have been indicated, each for transmission in a respective time-slot. The introductory parts have been inserted such that each frame $N_p$, $N_{p+1}$ may contain a number of packets $M_k$ ... with corresponding stamp information $S_k$ ...

For efficient use of the transmission capacity of the bus, it is desirable that the packets can be spread out over more than one frame $N_p$, $N_{p+1}$. In the third trace, the introductory parts $(X,LC)_p$ have been inserted in such a way that parts of the packet $M_{k+2}$ are in two frames $N_p$, $N_{p+1}$. The time-stamp information $S_{k+2}$ for this packet is in the last frame $N_{p+1}$ containing information from the packet $M_{k+2}$. Thus, as shown in the Figure, part of $M_k$, $S_k$, $M_{k+1}$, $S_{k+1}$, and part of $M_{k+2}$ are placed in one frame $N_p$, together with the introductory part $(X,L,C)_p$.

Because the data from a packet is spread out over more than one frame $N_p$, $N_{p+1}$, the data in the second frame does not start with the start of a packet. This can be disadvantageous if a frame $N_p$, is lost for example, due to an error in transmission. In that case, even packets $M_{k+3}$ which are not part of the lost frame $N_p$, may be irrecoverable if it is not possible to determine where they start in the frame $N_{p+1}$ because an unknown number of bytes from the preceding packet $M_{k+2}$ precedes them. To prevent this, each frame $N_p$, $N_{p+1}$ contains a respective pointer $X_p$, $X_{p+1}$ to the start of a packet in that frame (if any). This pointer may be computed by determining the number of bytes $X_p$ from the point at which the first part of a packet $M_k$ (which part is transmitted in one frame) ends to where the next packet begins. In case of a error in a time-slot, the interface unit 124 of the destination apparatus will read the pointer X of the next valid time-slot, and will start reading the next packet from the location in the time-slot indicated by that pointer.

Finally, in the fourth trace 96 of the Figure, the frames $N_p$, $N_{p+1}$ have been expanded with respective headers hdr(p), hdr(p+1) and with error correction information crc(p).

Figure 10:
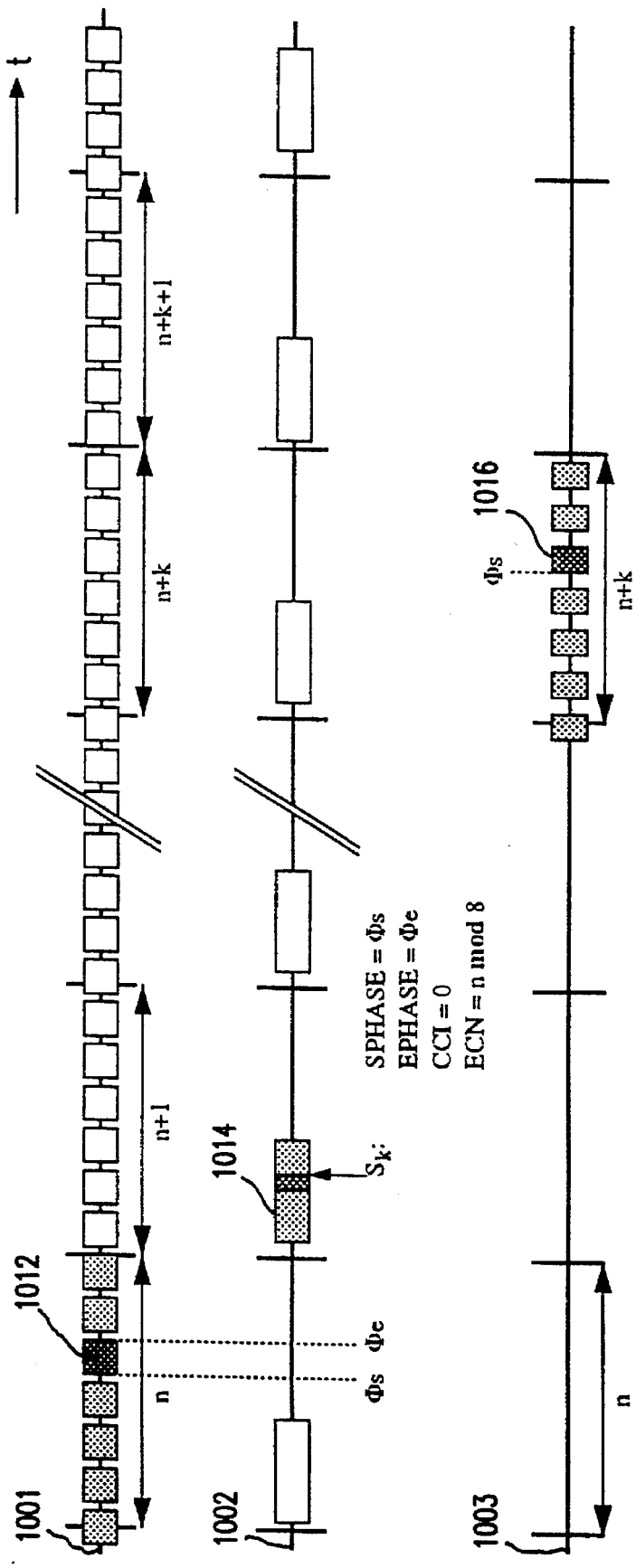
FIG. 10 shows an example of a data transmission.

FIG. 10 shows an example of a data transmission. The Figure contains three traces 1001, 1002, 1003 of the data as a function of time as it arrives at the input of the interface unit 104 in the source apparatus 10, on the bus 14 and at the output of the interface unit 124 of the destination apparatus 12, respectively. In the Figure, it is assumed that a number of packets arrives during each period <n> <n+1> ... of the periodically repeating pattern of time-slots.

The first trace 1001 shows a number of packets. The start and end of one packet 1012 have been indicated. These correspond to respective phases $\Phi_s$, $\Phi_p$ in the period <n> of the pattern of periodically allocated time-slots.

The second trace 1002 shows a number of time-slots in successive periods. In an indicated time-slot 1014, information from the packet 1012, including its associated time-stamp information is transmitted. The time-stamp information contains, for example, the phases SPHASE=$\Phi_s$, EPHASE=$\Phi_p$, the difference CCI between the period numbers <n> of arrival of the start and the end of the packet at the interface unit 104, (i.e. CCI=0) and ECN, the three least significant bits is the number of the period in which the end of the packet arrived at the interface unit 104.

The third trace shows only some of the packets, as they are outputted from interface unit 124 in the destination apparatus 12, and in particular, the packet 1016 which corresponds to the packet indicated on the first trace 1003. The start of outputting of this packet 1016 occurs at the same phase $\Phi_s$ of the period as at which it arrived at the interface unit 104 in the source apparatus. The output occurs with a delay of an integer number k of periods. The period number of outputting is computed from the number <n+1> of the period in which the information was transmitted via the bus 14 and the least significant part ECN of the number <n> of the period in which the end of the packet was received at the interface unit 104 in the source apparatus 10. The full period number <n> of the period in which the end of the packet was received at the interface unit 104 in the source apparatus 10 is recovered as the highest period number before <n+1> which has the indicated least significant part ECN. CCI is subtracted from the full period number <n> to determine the original period number <n> in which the start of the packet 1012 was received. Outputting occurs when the interface unit 124 in the destination apparatus 12 determined that the period count <n+k> has reached a fixed number k of periods after this original period number <n>.

Figure 11:
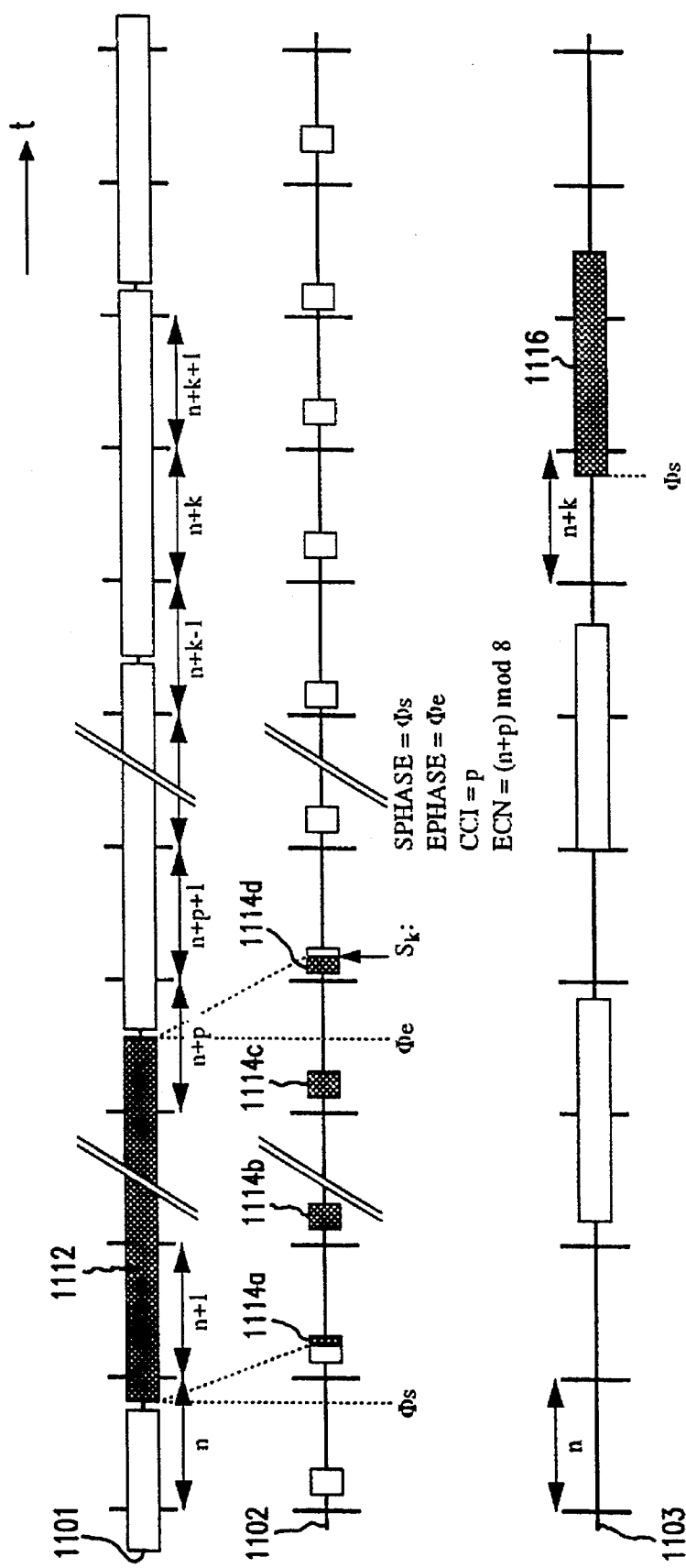
FIG. 11 shows a further example of a data transmission.

FIG. 11 shows a further example of a data transmission. The Figure is generally similar to FIG. 10 but in contrast to this Figure, it is assumed that each packet (e.g. 1112) arrives at the interface unit 104 in the source apparatus during a number of periods <n> <n+1> . . . of the periodically repeating pattern of time-slots. FIG. 11 contains three traces 1101, 1102, 1103 of the data as a function of time as it arrives at the input of the interface unit 104 in the source apparatus 10, on the bus 14 and at the output of the interface unit 124 of the destination apparatus 12, respectively.

The first trace 1101 shows a number of packets. The start and end of one packet 1112 have been indicated. These correspond to respective phases $\Phi_s$, $\Phi_p$ in the periods <n>, <n+p> of the pattern of periodically allocated time-slots.

The second trace 1102 shows a number of time-slots in successive periods. In an a number of successive time-slots 1114a–d information from the packet 1112, including its associated time-stamp information is transmitted.

The third trace shows the packets, as they are output from interface unit 124 in the destination apparatus 12, and in particular the packet 1116 which corresponds to the packet indicated on the first trace 1103. The start of outputting of this packet 1116 occurs at the same phase $\Phi_s$ of the period as at which it arrived at the interface unit 104 in the source apparatus. The output occurs with a delay of an integer number k of periods.

It will be noted that the scheme of encoding the time-stamps allows a predetermined delay both for packets that last for less than a period of the pattern of periodically allocated time-slots and for packets that last for a plurality of such periods, with an information capacity for coding the time-stamp for the end of the packet that does not depend on the length of the packet.

I claim:

1. A signal processing system comprising a source apparatus coupled to a destination apparatus, the source apparatus being arranged for supplying the destination apparatus with a sequence of packets, each of said packets comprising a time-stamp, the destination apparatus comprising a clock; means for receiving the packets; means for detecting when a time-value of the clock corresponds to the time-stamp in a particular packet; and means for presenting data from that particular packet at an output, characterized in that the system comprises a bus operable according to a time-slot allocation protocol, the source apparatus comprising means for supplying the packets to the destination apparatus via the bus; and means for supplying a first and a second part of at least one of the packets in different time-slots, the destination apparatus comprises means for presenting data from the first part and second part together upon detecting when the time-value of the clock corresponds to the time-stamp in the at least one of the packets.

2. A signal processing system according to claim 1, wherein the destination apparatus comprises means for supplying at least part of at least a further one of the packets after supplying the second part, the further one of the packets being supplied in the particular time-slot in which the destination apparatus supplies the second part; and means for supplying an identification for identifying a location in the particular time-slot of the further one of the packets, the identification being supplied at a predetermined location in the particular time-slot.

3. A signal processing system according to claim 1, wherein the source apparatus comprises an input for receiving the packets; means for obtaining respective time-samples of a clock at the start of arrival of the packet and at the end of arrival of the packet at said input; and means for transmitting information about said time-samples to the destination apparatus, the destination apparatus comprising means for regulating a speed of presenting said packet in accordance with a difference between said time-samples.

4. A signal processing system according to claim 1, the destination apparatus comprising a first-in-first-out buffer, means for storing time-stamps received via the bus in the first-in-first-out buffer, and means for comparing each time stamp with a count value of the clock, as soon as the time-stamp preceding it in the first-in-first-out buffer matches the count value of the clock.

5. A signal processing system according to claim 3, the source apparatus comprising a first-in-first-out buffer for the time-stamps coupled between said means for obtaining respective time-samples, and said means for transmitting information about said time samples.

6. A source apparatus for a signal processing system, said system comprising a source apparatus coupled to a destination apparatus by means of a bus operable according to a time-slot allocation protocol, the source apparatus being arranged for supplying the destination apparatus with a sequence of packets, each of said packets comprising a time-stamp, characterized in that the source apparatus comprising means for supplying the packets to the destination apparatus via the bus; and means for supplying a first and a second part of at least one of the packets in different time-slots.

7. A destination apparatus for a signal processing system, the system comprising a source apparatus coupled to a destination apparatus by means of a bus operable according to a time-slot allocation protocol, the destination apparatus receiving a sequence of packets from the source apparatus, each of said packets comprising a time-stamp, the destination apparatus comprising a clock; means for receiving the packets; means for detecting when a time-value of the clock corresponds to the time-stamp in a particular packet; and means for presenting data from that particular packet at an output, characterized in that a first part and a second part of at least one of the packets are supplied in different time-slots, and the destination apparatus comprises means for presenting data from the first part and the second part together upon detecting when the time-value of the clock corresponds to the time-stamp in the at least one of the packets.

* * * * *